Figure 3:
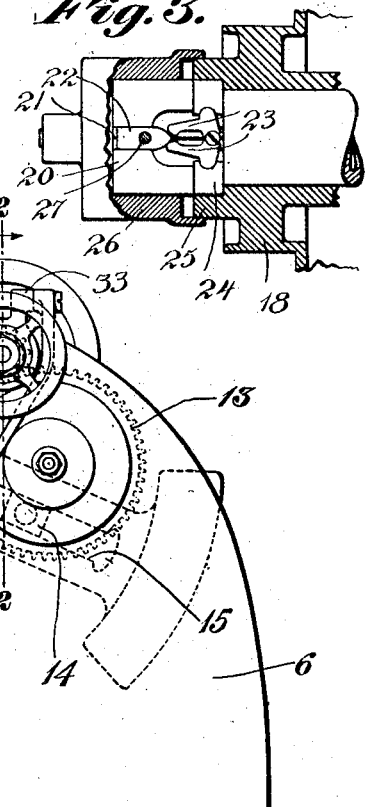

B. M. W. HANSON.
CLUTCH ACTUATING DEVICE.
APPLICATION FILED JUNE 13, 1912.

1,084,545.

Patented Jan. 13, 1914.

Witnesses:

Inventor:
B. M. W. Hanson
By his Attorneys,

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

CLUTCH-ACTUATING DEVICE.

1,084,545.  Specification of Letters Patent.  Patented Jan. 13, 1914.

Application filed June 13, 1912. Serial No. 703,563.

*To all whom it may concern:*

Be it known that I, BENGT M. W. HANSON, a citizen of the United States, residing at Hartford, in the county of Hartford and State of Connecticut, have invented certain new and useful Improvements in Clutch-Actuating Devices, of which the following is a specification.

This invention relates to clutch actuating devices, the object of the invention being to provide simple, readily operable and compact means by which a power driven member can be connected with a shaft.

In the drawings accompanying and forming part of the present specification there is shown one convenient form of embodiment of the invention which to enable those skilled in the art to practise the same will be fully set forth in the following description, the novelty of the invention being covered in the claims succeeding said description. From this it will be clear that the invention is not limited to the exact showing made by said drawings and description as departures in several respects may be made therefrom within the scope of the invention defined by said claims.

Figure 1:
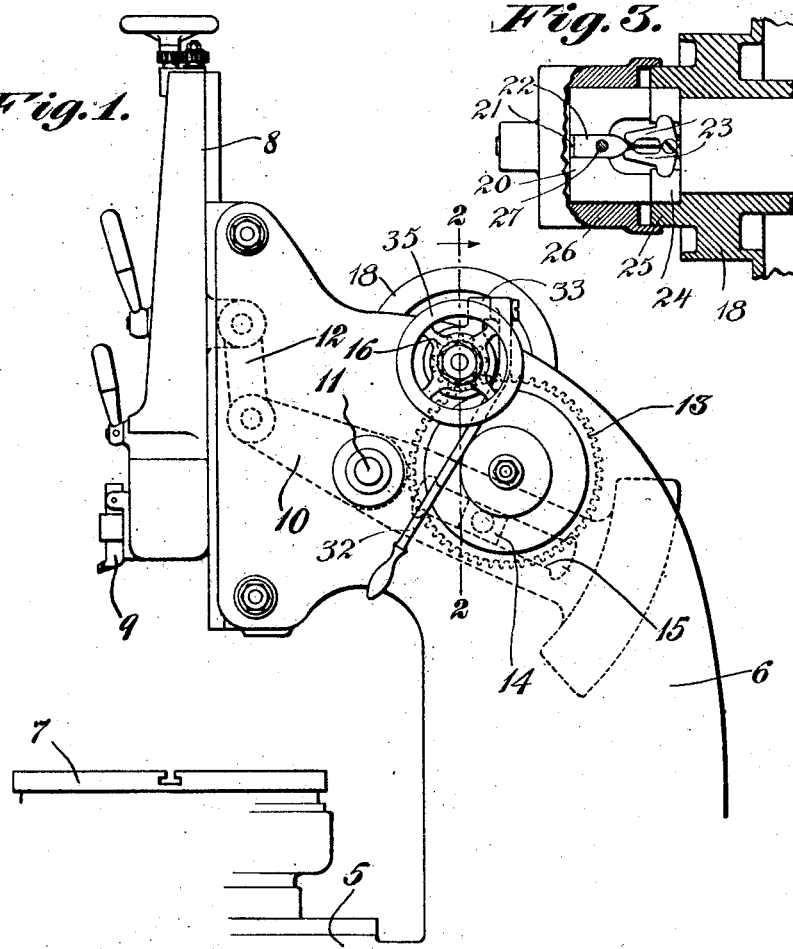
Figure 2:
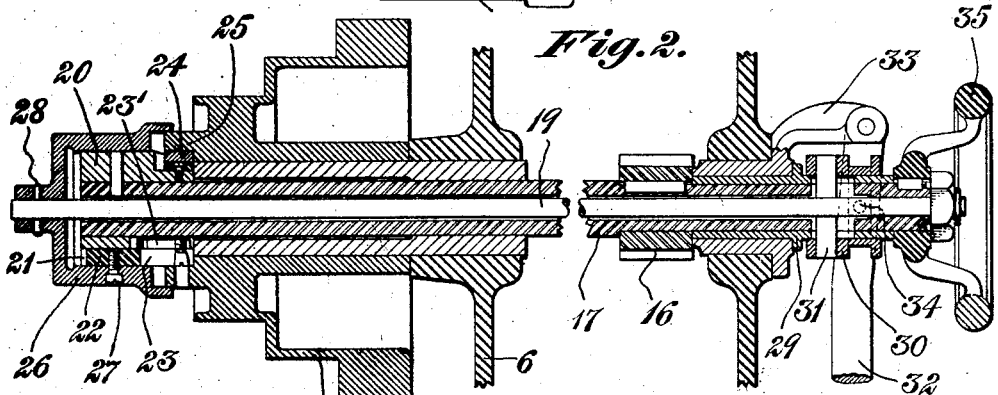

Referring to said drawings: Figure 1 is a side elevation of portion of a shaper equipped with clutch actuating device involving the invention. Fig. 2 is a vertical section on the line 2—2 of Fig. 1 looking in the direction of the arrow, and, Fig. 3 is a sectional detail view of part of the driving and adjusting mechanisms, this view showing also clutch means.

Like characters refer to like parts throughout the several figures of the drawings.

A clutch actuating device embodying my invention may be used in various connections, for example and as illustrated, it may be incorporated in a shaper. The shaper shown comprises a base or bed as 5 and a column 6 rising therefrom, the bed 5 being shown equipped with a work holder 7. The column 6 supports the slide 8, and although the same is represented as capable of reciprocation in a vertical direction, this is not a matter of consequence. The slide is furnished with the shaping tool 9. Mounted in the hollow column 6 is a counterweighted lever 10, pivotally supported between its ends as at the shaft 11 and connected at its inner end as by the link 12, with the back of the slide 8. It will be, therefore, clear that when the lever 10 is oscillated the slide 8 will be reciprocated on the column 6. Within the column is a spur-gear 13 having pivoted on one side the block or shoe 14 fitting the longitudinal slot 15 in the outer arm of the lever 10. Hence, it will be evident that as the spur gear 13 is rotated the slide 8 through the intermediate parts, will be moved down and up on the column 6. In mesh with the spur gear 13 is a pinion 16 rigid with the hollow shaft 17 which latter as will hereinafter appear is adapted to be operated either by power or hand. The shaft 17 and the connections between the same and the slide 8 are not uncommon in this art and form no specific part of the present invention, for which reason they need not be described further in detail. As a matter of fact any other suitable shaft and connections between the same and the slide 8 or its equivalent, might be utilized for the purposes in view.

The shaft 17 is provided with a suitable driver such as the stepped pulley 18 loose thereon but adapted to be operatively connected thereto as by a clutch, when it is desired to rotate the latter by power. Said shaft 17 is supported by and projects outward beyond the sides of the column 6. A rod 19 extends entirely through said shaft and connected with one end of the rod is a lever or equivalent device hereinafter described, for operating the same, while associated with the opposite end of said rod is a clutch by which the driver or pulley 18 can be connected to or disconnected from the shaft 17. Pinned or otherwise suitably connected to said shaft 17 is the block 20 having a groove or channel 21 to receive the sliding wedge 22 which is adapted to enter between and spread, the companion levers 23 fitted between the ends of the split expansible ring 24 fitted in the annular flange 25 projecting outward from the pulley 18. The wedge 22 is pinned to the sleeve 26 by a screw as 27, the sleeve in turn being pinned to one end of the longitudinally movable rod 19 as by the pin 28. Consequently it will be understood that when the rod 19 is moved longitudinally of the shaft 17, the sleeve 26 and hence the wedge 27 will be moved in a corresponding direction. When the rod 19 is moved to the right in Fig. 2 the wedge 22 will spread the levers 23 so as to expand the divided, spring clutching ring 24 into frictional engagement with the flange 25 to thereby clutch the pulley 18 to the shaft 17 so that if said pulley be rotating the shaft will be driven. On the movement of the rod 19 to the left the pulley will be unclutched from the shaft. The two levers 23 are pivoted to a longitudinally shiftable support 23' guided in a channel of the block 20.

The clutch described is familiar in the mechanical arts so that a more detailed description of the same is unnecessary; some other type of clutch might be substituted therefor. It should also be stated that the sleeve 26 is closed at the outer end, its inner portion overlying the flange 25 so that the clutch parts are incased, and thereby protected.

Supported by the shaft 17 and directly by a bushing 29 thereon, is the slidable sleeve 30 connected as by the pin 31 with the rod 19, so that when the sleeve 30 is moved longitudinally of the shaft 17 the rod 19 will be similarly operated and for thus operating said sleeve the lever 32 may be provided, said lever being pivotally connected at its upper end to the bearing or bracket 33 on the column 6 and having a stud 34 between its ends fitting a peripheral groove in the sleeve 30.

Keyed or otherwise suitably fastened to the shaft 17 is a manual operating member therefor, and the hand wheel 35 answers satisfactorily in this connection. It will be assumed that the pulley 18 is clutched to the shaft 17 by the clutch mechanism already described. In this event the slide 8 through its described connections with said shaft is reciprocated on the rotation of the latter. It will be assumed that it becomes necessary to adjust the slide 8 to bring the tool 9 into a definite relation with the work on the work support 7. In this event the following procedure may be adopted: The handle of the lever 32 will be grasped and said lever thrust inward which moves the rod 19 to the left and therefore through the described parts, tends to move the wedge 22 from between the tails of the levers 23 to permit the contraction of the spring ring 24, and the consequent unclutching of the pulley 18 from the shaft 17. When this occurs said shaft can be turned by hand through the agency of the wheel 35 to either raise or lower through the intermediate described connections, the slide 8 and correspondingly adjust the tool 9. When the adjustment is obtained the pulley 18 will be clutched to its shaft by the opposite operation of the lever 32 to effect the operation of the slide 8 by power.

What is claimed is:

1. The combination of a shaft, a rod extending entirely through the shaft, means for manually rotating said shaft, manually-operable means for reciprocating said rod, a power-driven member loose on said shaft, a sleeve fastened to said rod, and clutch mechanism operated by said sleeve, for clutching said power-driven member to said shaft.

2. The combination of a shaft, a rod extending through said shaft, manually-operable means for endwise moving said rod, manually-operable means for rotating said shaft, a power-driven member loose on said shaft, a split clutching ring, said power-driven member having a seat to receive said ring, a sleeve fastened to said rod for movement therewith, and means in said sleeve, for expanding said ring into frictional engagement with said power-driven member.

3. The combination of a shaft, a rod extending entirely through said shaft, manually-operable means connected with said rod at one end thereof for moving the same in an endwise direction in said shaft, manually-operable means connected with the corresponding end of said shaft for rotating the same, a sleeve fastened to the other end of said rod, for movement therewith, a power-operable member loose on said shaft, and clutch means within and operable by said sleeve, for clutching said power-operable member to said shaft.

4. The combination of a rotary shaft, a rod extending entirely through said shaft, a power-operable member loose on said shaft, manually-operable means for moving said rod in an endwise direction within the shaft, manually-operable means for rotating said shaft, a split clutching ring coöperative with said power-operable member, a pair of levers for expanding said ring into frictional engagement with said power-operable member, a sleeve connected to and operable by said rod, and a wedge inclosed and carried by the sleeve, for expanding said levers and thereby said ring.

5. The combination of a rotary shaft, a rod extending entirely through said shaft, a sleeve slidable on said shaft and pinned to said rod, the shaft having a longitudinal slot to receive the pin connecting said sleeve and rod, a hand-lever for shifting said sleeve on said shaft, a hand-wheel for rotating said shaft, a sleeve closed at its outer end, connected with said rod for movement therewith, a power-operable member loose on said shaft, a split clutching ring coöperative with said power-operable member, a pair of levers for expanding said ring into frictional engagement with said power-operable member, and a wedge within and connected to said second sleeve, for expanding said levers.

In testimony whereof I affix my signature in presence of two witnesses.

BENGT M. W. HANSON.

Witnesses:
W. N. HORST,
N. S. BATES.